Fig. 3a.

July 3, 1945.  E. J. RABENDA  2,379,827

RECORDING AND COMMUNICATION APPARATUS

Filed Jan. 26, 1944   8 Sheets-Sheet 7

MASTER CARD   FIG. 4.

DETAIL CARD   FIG. 5.

FIG. 6.

INVENTOR
EDWARD J. RABENDA
BY

ATTORNEY

July 3, 1945.  E. J. RABENDA  2,379,827

RECORDING AND COMMUNICATION APPARATUS

Filed Jan. 26, 1944  8 Sheets-Sheet 8

FIG. 7.

| ALBANY 136 | | | | | | | | |
|---|---|---|---|---|---|---|---|---|
| ITEM NUMBER | | | | | DATE | | | ISSUED YR. |
| CLASS 1 | CLASS 2 | CLASS 3 | CLASS 4 | ISSUE | MO. | YR. | ON HAND | TO DATE |
|  |  | 0016583 |  | 0532145 | .4 | 2 | 0053489 | 08534896 |

INVENTOR
EDWARD J. RABENDA
BY
W. M. Wilson
ATTORNEY

Patented July 3, 1945

2,379,827

UNITED STATES PATENT OFFICE 2,379,827

RECORDING AND COMMUNICATION APPARATUS

Edward J. Rabenda, Binghamton, N. Y., assignor to International Business Machines Corporation, New York, N. Y., a corporation of New York Application January 26, 1944, Serial No. 519,723

8 Claims. (Cl. 164—115)

This invention relates to record controlled apparatus for recording or communicating information, and it has for its general object to increase the flexibility of such apparatus.

More particularly, it is an object of the invention to provide a record controlled apparatus whereby different significations can be imparted to the same indicia of a control record.

Another object is to provide an apparatus of the kind described whereby the recording instrumentalities can be jointly controlled by a plurality of control records.

Other objects of the invention will be pointed out in the following description and claims and illustrated in the accompanying drawings, which disclose, by way of example, the principle of the invention and the best mode, which has been contemplated, of applying that principle.

By way of illustration, the invention will be described as applied to an apparatus which performs one step in the procedure for recording at a distant station, by telegraphic means, data stored on record cards in statistical code. The apparatus to be described is concerned with the conversion of the statistical code record into a telegraphic code record, perforated in a tape.

Figure 8:
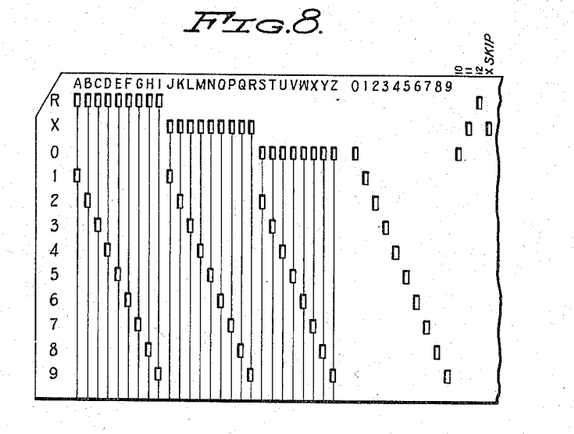
Fig. 8 is a diagram of the statistical code used in Fig. 5.

The statistical code employed in the illustrative apparatus is one used in "International" tabulating machines, sometimes referred to as the "alphabet" code, and is shown in Fig. 8. The area of a record card is subdivided into twelve horizontal rows of index point positions and usually eighty vertical columns. The rows of index point positions are identified respectively as R, X, 0, 1, 2, 3, 4, 5, 6, 7, 8 and 9. Each column may receive a perforation, or combination of perforations, designating one character. As shown in Fig. 8, the letters are represented by combinations of perforations in the R, X, or 0 positions with perforations in the 1, 2, ... 9 positions. The ten digits are represented by single perforations in the 0, 1, 2 ... 9 positions, respectively. In addition, single perforations in the 0, X or R positions may represent a ten, an eleven, or a twelve, for instance, the tenth, eleventh or twelfth month, respectively. Also, a single hole in the X position may be used to control a functional operation known as X skipping, which is similar to tabulating in typewriter operation. In typewriting, operation of the TAB key causes the carriage to skip a number of letter spaces determined by an adjustable tabulation control device. Similarly, in operation of the "International" duplicating punch and verifier, which analyze, duplicate, and verify record cards of the kind shown in Fig. 8, the sensing of an X hole in a certain column will cause the machine to skip a number of columns determined by an exchangeable control member, called a skip bar. See, for example, Patents 1,426,223; 1,962,750; and 2,315,741.

When a record card employing the code shown in Fig. 8 is used to control the perforation of a tape which is to control a printing telegraph, it is sometimes necessary to distinguish X holes which mean the eleventh month, for example, from those which call for an X skip; for in the operation of a telegraph printer an X skip hole should cause the printer to tabulate, whereas an X hole used to represent the eleventh month should cause the printer to print a character which, by convention, stands for eleven (customarily a period) and not to tabulate. In accordance with the invention, the differentiation of the different meanings of the X hole is accomplished by means of a master card, which modifies the operation of the code converting means to cause a special code combination to be perforated in the tape for an X skip hole, the special combination causing the printer receiving the telegraphically communicated information to tabulate. The operation will be explained more fully later on, by reference to an illustrative example, but first a brief description of the construction of the machines used will be given.

The record card reading machine

The cards upon which the data is stored in statistical code are read by a machine which is basically the same as the one disclosed in the copending application of Mills & Rabenda, Serial No. 450,248, filed July 9, 1942. Consequently, the details of the construction of the machine will not be repeated here. Its essentials are shown diagrammatically in Fig. 1. A detail card DC from which the data is to be read is supported upon a bed (not shown) between two fingers 13 and 14 carried by an escapement bar 15. The escapement bar has bottom teeth meshing with a gear 16 driven by the usual spring motor drum 17 in the proper direction to urge the escapement bar toward the left, but its movement is controlled by escapement dogs 47 and 48 which can be brought into engagement alternately by escapement operating means described in said application Serial No. 450,248, to allow a step-by-step movement. Below the card is a row of sensing brushes 12 mounted upon an insulating bar 90, which is normally dropped to disengage the brushes from the card, but which can be elevated by a parallel bar mechanism 93 operated by the armature 94 of an electromagnet 92. As it swings to operated position, the armature 94 opens a pair of contacts 95, to be referred to later. Above the card is a contact roller 91 with which any brush finding a perforation in the related index point position of the card comes in contact.

In addition to the detail card sensing mechanism, the machine has a master card sensing mechanism, which is adapted to sense the columns of a master card concurrently with the sensing of the columns of the detail card. The mechanism is similar in construction to the one shown in the patent to Shafer 2,315,741. The details of the construction of this mechanism can be learned from Figs. 1 and 9 of said patent. It comprises a bed (not shown) adapted to support a master card MC similar in shape and size to the detail card. The master card is placed between two fingers 97 and 98 fixedly mounted on the escapement bar 15. Below the master card is a row of sensing brushes 101 mounted upon an insulating bar 102 which is normally dropped so that the brushes are out of contact with the card, but which can be swung by its parallel bar frame 103 operated by the armature 104a of a magnet 104 to raise the brushes into contact with the bottom of the master card. Above the latter is a sensing roller 105 with which any brush finding a hole in the master card makes contact.

Figure 1:
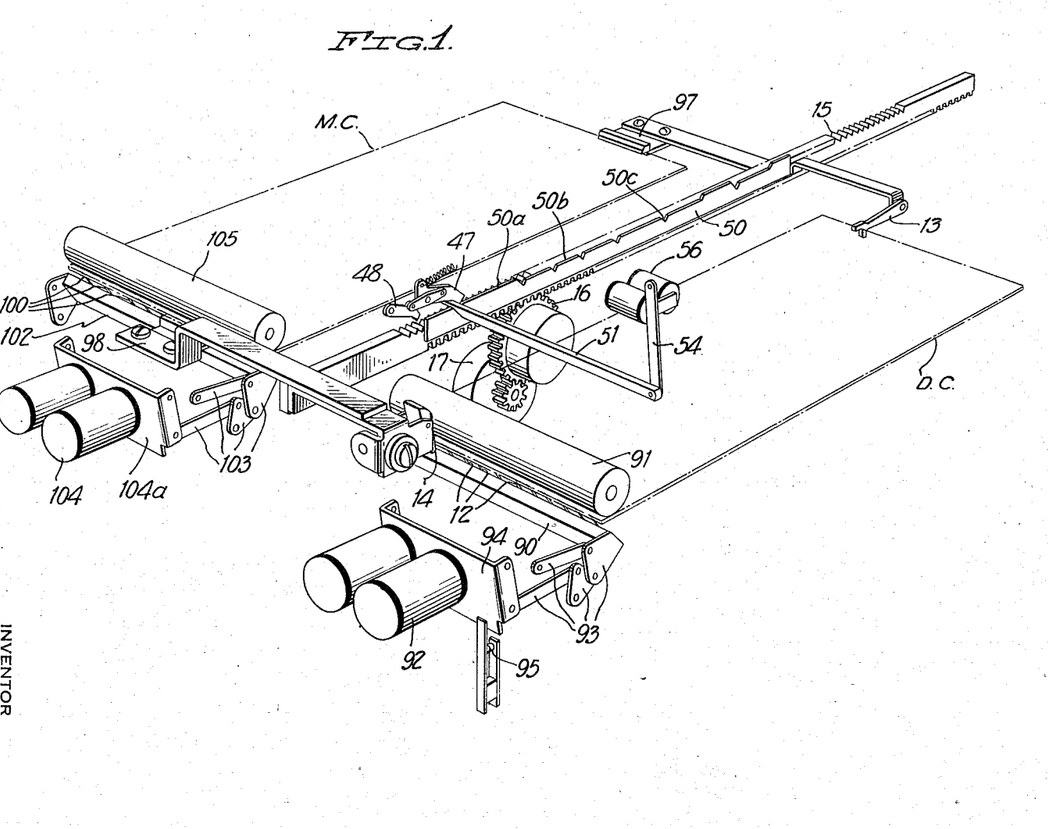
Fig. 1 is a semi-diagrammatic perspective view of the control record sensing machine.

The machine is also provided with mechanism to cause the card feed to skip over certain fields. This mechanism (see Patent 2,315,741, Fig. 7) comprises a skip lifter 51 inserted under the dog 47 and resting at its inner extremity upon the upper edge of an exchangeable skip bar 50. The skip lifter can be shifted to the rear by a pivoted arm 54 operated by a skip magnet 56 and has near its rear end an inclined bottom edge, which rides up on skip bar 50 and lifts the dog 47 free from the escapement bar 15. The skip bar 50 may have a high surface 50a capable of lifting the dog 47 when the skip lifter is in forward position, a medium surface 50b capable of lifting the dog only when the skip lifter is shifted to the rear, and notches 50c which allow the dog to engage the escapement bar whatever the position of the skip lever.

Various other parts and accessories of the machine are identical to those disclosed in the Mills & Rabenda application Serial No. 450,248. Their construction will not be described here, but some of them will be referred to later in connection with the circuit diagram.

Tape perforator

The card sensing machine controls a tape perforator. The construction of this machine is fully disclosed in the above mentioned Mills & Rabenda application Serial No. 450.248 and is shown in semi-diagrammatic form in Fig. 2 of the present application. It comprises individual punch elements 210, one for each of the five units of the telegraphic code and one for punching the feed hole 202. There is a die block 211 for the punch elements and individual springs 213 normally hold the latter retracted. Each punch element has a recess 216 into which is inserted one end of a rockable punch lever 217 having an oval shaped opening 218. An individual punch lever is provided for each punch element. An elongated cam or eccentric 219 on a shaft 220 is disposed within the oval shaped openings of the punch levers, to support and actuate said levers. Normally, during the rotation of the eccentric, the punch levers move downward and upward about their pivotal connections with the punch elements 210. Under these conditions the free right ends of the punch levers are rocked idly downward and upward.

Figure 2:
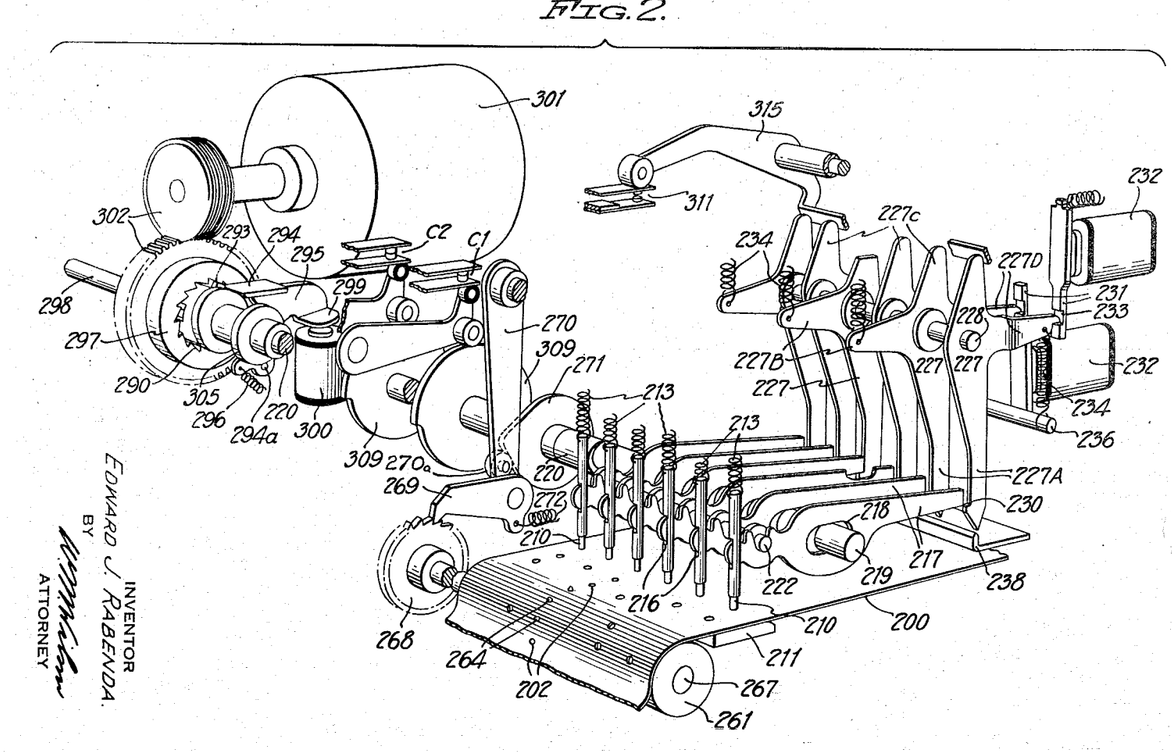
Fig. 2 is a semi-diagrammatic perspective view of a tape perforator controlled by the machine shown in Fig. 1.

A plurality of latch members 227, one for each punch lever, are pivotally supported by a shaft 228, in cooperative relation to their respective punch levers. The downwardly extending arms 227A of the latches have latching shoulders 230 to engage under the right ends of their punch levers 217. All of the latches, except the one pertaining to the feed hole punch, have arms 227D extending to the right and three of them, in alternate positions, also have leftwardly extending arms 227B. The latter arms are biased upward by individual springs 234, while the arms 227D of the other three latches are biased downward by springs 234 anchored to a stationary pin 236. The springs 234 urge the latches in clockwise direction but, with the exception of the latch pertaining to the feed hole punch, the latches are normally held in retracted position, with the hooks 230 out of the path of the punch levers, by their rightwardly extending arms 227D, the ends of which are detained in recesses 233 of related armatures 231 pertaining to tape punch selector magnets 232, only two of which are shown in the drawings. Upon energization of the individual magnets 232, the related armatures 231 are attracted and release their respective latches, permitting them to swing under the influence of springs 234, to engage their shoulders 230 under the free ends of the corresponding punch levers 217.

The shaft 220 is operated in a start-stop manner, by means to be described presently, the latch levers 227 which are to be engaged being released at the start of each cycle, when the right ends of the punch levers are in their uppermost positions, or approaching their uppermost positions. Thus, upon latching of a punch lever 217 the following rotation of the eccentric 219 rocks the punch lever counterclockwise about its pivotal connection with the latch lever forcing the related punch element 210 through the telegraphic tape 200. A restoring bail (not shown) is provided to restore the latch levers 227 at the end of each punch cycle and a locking bail 238 may also be provided to lock the latch levers in effective or ineffective position through the punch cycle.

Means are provided for intermittently advancing the tape 200 near the end of each cycle of rotation of the shaft 220. The tape is fed from a supply reel (not shown) through a tape feeler mechanism such as shown in the above mentioned copending application. The feeler mechanism operates the tape contacts 317 shown on the circuit diagram (Fig. 12a) to indicate exhaustion of the tape supply. The tape is fed between the die block 211 and the punch elements 210 and over a sprocket wheel 261. The sprocket wheel 261 has a series of teeth 264 to engage the feed holes 202. The feed holes are punched by a punch element 210, the punch lever 217 of which is constantly latched by a stationary latch lever 227 having no latching arm 227D, so that a feed hole is punched on each revolution of the shaft 220. The shaft 267 of the sprocket wheel 261 has secured thereto a ratchet wheel 268, which is advanced step by step by a pawl 269 pivotally mounted on a cam follower arm 270. A spring 272 anchored to a fixed part and hooked into the pawl 269 urges the pawl against the ratchet 268 and pulls the arm 270 to the right so that a roller 270a thereon bears against a cam 271 on shaft 220. Near the end of each cycle of shaft 220 the high point of cam 271 moves the cam follower arm 270 and pawl 269 to the left to advance the ratchet wheel 268 and the sprocket wheel 261 one step. Thus, the tape 200 is fed to present the next position thereon to the punch elements. When the high part of the cam 271 passes, the pawl 269 is retracted to engage the next tooth of the ratchet wheel 268.

The start-stop operations of the shaft 220 are controlled by a one revolution clutch 290, which is shown only in outline in Fig. 11, but may be constructed in the manner fully disclosed in United States Patent 2,206,646, issued to Schneider on July 2, 1940. The clutch is controlled by a dog lift lever 293, which when stopped by a detent 294 disconnects the shaft 220 from a constantly driven shaft 298 driven by motor 301 through a worm and wheel gearing 302. The detent 294 also determines the stationary angular position of the shaft 220. Detent 294 is part of a rocker arm 295 pivoted at 294a and biased counterclockwise by a spring 296. The arm 295 has a bent over portion 299 which acts as an armature to a clutch magnet 300. When the magnet is energized, the detent 294 is retracted from the dog lift lever 293 and the clutch engages. The shaft 220 is rotated until the magnet 300 is deenergized, dropping the detent 294 into the path of dog lift lever 293. The engagement of the detent with the dog lift lever disengages the clutch and stops shaft 220 in a fixed angular position.

A pair of normally open bail contacts 311 are operated by a pivoted bail lever 315, which is rocked by the upwardly extending arm 227c of any released latch lever 227, to close the contacts 311. The contacts 311 are employed, at certain times, for controlling the energizations of the clutch magnet 300.

Two additional pairs of contacts C1 and C2 are operated cyclically by related cams 309 secured to shaft 220. The functions of these cam controlled contacts will be explained later. They are timed so that the contacts C1 close before the end of a punch cycle and remain closed when the punch shaft is stopped and during the first part of the next cycle, while the contacts C2 are normally open, close after the cycle begins, and remain closed during the first part of the cycle (see timing diagram Fig. 10 in application Serial No. 450,248).

Figure 9:
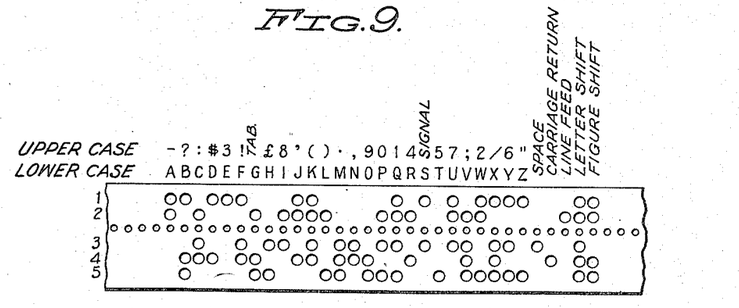
Fig. 9 is a diagram of the telegraphic code used in Fig. 6.

The telegraphic code perforated in the tape is shown in Fig. 9. Each code combination representing a letter may have a second significance—it may represent a numerical digit, a punctuation mark, or a function signal. The significance intended is indicated by a key code signal which causes the telegraph printer to shift to upper case, if it is the "figure shift" signal, or to shift to lower case, if it is the "letter shift" signal. Since the printer remains in either case position until shifted by the opposite case shift signal, it is only necessary to insert a key code signal when there is a change in the class of characters. The insertion of the key code signal is done automatically by the control apparatus, as described in application Serial No. 450,248.

*Operation*

Figure 5:
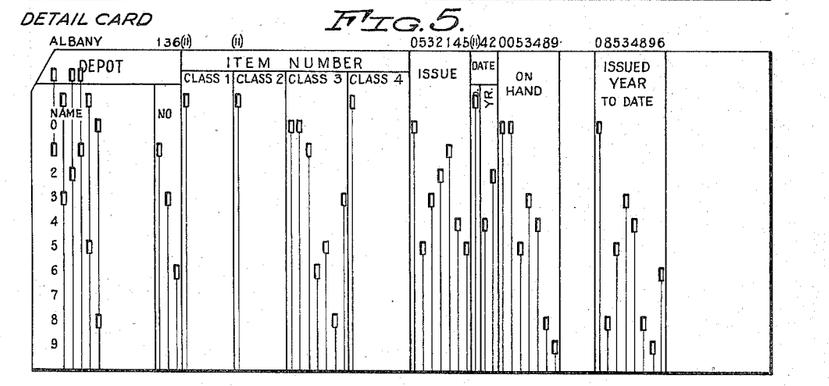
Fig. 5 is a diagram showing a detail card.

To illustrate one type of work where the invention comes into use, assume a branch office reporting to the main office upon the issuance of various stock items of four different classes. The information is stored on detail cards, such as shown in Fig. 5. At the left end of this card are two fields denoted by vertical lines, occupying columns 1 to 15, to receive the name and number of the depot or branch office. From columns 16 to 41 there are four fields reserved for the four classes of stock, respectively. The card will have in one of these four fields the stock item number. In Fig. 5 the stock item number appears in the field denoted Class 3. Beginning at column 42 is a field entitled "Issue," wherein the number of items issued in the transaction noted in this card is punched. After this there are two fields for the month and year. The card contains two additional fields for data showing the stock remaining on hand and the number of the stated items issued during the year to the date given on the card.

It will be observed that the fields for classes 1, 2 and 4 contain a single hole in the X position in the first column of each field. These are X skip holes and indicate that the field is to be skipped over, without sensing the individual columns. This is the well known operation previously mentioned, whereby, in combination with a suitably notched skip bar the card is fed at once across the width of the field and then stopped. In the field reserved for the number of the month there is also shown a hole in the X position. This hole designates the eleventh month, i. e. November. It does not cause a skip feed of the card because the above mentioned notched bar has a deep notch opposite this column. This is all standard card operation. The difficulty which the present invention is designed to overcome occurs when a telegraph printer is operated under control of the card, or a tape prepared therefrom. The printer does not have a notched bar to determine whether the X hole in a certain column represents an X skip or an eleven.

Figure 4:
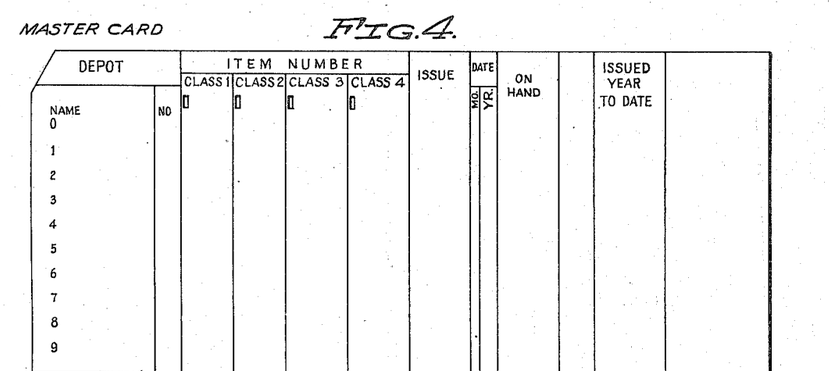
Fig. 4 is a diagram showing a master card.

In accordance with the present invention, means are provided to set up a different telegraphic code signal for these two significances of an X hole in the card. This is accomplished by means of a master card, such as shown in Fig. 4. This card has an X hole in each column corresponding to a column of the detail card where an X hole would represent an X skip operation.

In a column corresponding to one in the detail card where an X hole would represent 11, there is no X hole in the master card. The manner in which the master card effects its control will be seen from the following detailed description of the perforation of a tape under control of the master and detail cards shown in Figs. 4 and 5.

In preparing the apparatus to perforate, in a telegraph control tape, the statistical data contained in a stack of detail cards, the stack of cards is placed in a hopper to the right of the position of the detail card DC in Fig. 1 (see hopper 10 in Fig. 1 of Mills & Rabenda application Serial No. 450,248). It will be assumed that the detail card shown in Fig. 5 is on the bottom of the stack. The master card shown in Fig. 4 will be inserted between the brushes 101 and contact roller 95 and between the fingers 97 and 98. A blank tape 200 (Fig. 2) is drawn out from a supply roll (not shown) and over the feed roller 261. The bottom card of the stack is manually fed to the position shown in Fig. 1, where its feed is taken over by the fingers 13 and 14. In passing to this position it closes the card lever contacts 156 (Fig. 3a); from the positive side of the line a circuit is thereby completed through the line switch (assumed to be closed), wire 360, latch contacts 35, wire 362, said card lever contacts 156, coil of relay R17 to the negative line wire 361, energizing said relay. Contacts R17b close, completing a holding circuit for relay R17. Contacts R17a close, completing an obvious circuit through brush magnets 92 and 104, energizing said magnets and causing the brushes 12 and 101 to be raised into contact with the cards DC and MC, respectively. Reading brush magnet contacts 95 open as the brushes are raised, deenergizing the coil of relay R14, the function of which will be described later.

It will be assumed that the card reading machine is provided with a skip bar 50 (Fig. 1) having a high surface 50a coextensive with columns 1 to 15. This high surface of the skip bar lifts the escapement dog 47 from the rack bar 15 and allows the latter to feed until the skip lifter 51 drops into the first notch 50c placed at column 16 and the dog 47 is therefore dropped onto the escapement bar to stop the latter in this column position. The floating cam contacts 149 are held open whenever the dog 47 is lifted from the rack bar. As soon as the dog drops into the escapement bar, the floating cam contacts close and, since the brushes 12 and 101 are at this time sensing column 16 of the detail card and the master card, respectively, circuits are completed from wire 360, through latch contacts 35, floating cam contacts 149, roller 91, the hole in the card DC in the X position and the related brush 12, relays RX and R11, to wire 361; also, through contact roller 105, the X hole in the card MC, brush 101 in the X position, relay R71 to wire 361. Relays RX, R11, and R71 are energized, but the operation of their contacts is not immediately effective and reference to them will be deferred for the present.

The operator now presses the start key (Fig. 3b) closing contacts 350 and completing an obvious circuit from wire 360, through said contacts and relay R20 to wire 361, energizing said relay. Contacts R20b close completing a holding circuit for relay R20 from line wire 360, through tape controlled contacts 317 (which are closed as long as the tape is present in the punch), the contacts 351 of the start key, said contacts R20b, and relay R20 to line wire 361. Contacts R20a close to prepare a circuit which will be referred to later on. Contacts R20c also close, completing a circuit from wire 360, through latch contacts 35, floating cam contacts 149, wires 363, 364, contacts R14c (now closed), said contacts R20c and relay R21 to line wire 361, energizing said relay. The relay R21 is one of a chain of timing relays. Its contacts R21a close to complete an obvious circuit through the latch contacts and wire 362 to relay R22 and R24, energizing said relays. The contacts R22a close to complete a circuit through relay R23, energizing said relay.

The timing and function of these relays R21—R24 are explained in the Mills and Rabenda application Serial No. 450,248 and Rabenda application Serial No. 510,156. Briefly, the relays R21—R23 provide a delay between the sensing of a column of the control records and the energization of the distributing relay (Fig. 3c) which is to select the tape punch magnets corresponding to the translation of the code combination sensed. This delay provides time for a supervisory mechanism to be operated if there is a change in the class of character, to delay the energization of said distributing relay until the next cycle, to disable the escapement control for one cycle, and to cause an appropriate key code signal to be punched in the tape. A key code signal is always punched when the sensing mechanism first becomes effective on a new card, or upon sensing the first column following an X skip. The relay R24 has the function of maintaining the punch shaft in continuous rotation, except under certain conditions to be explained.

Figure 3A:
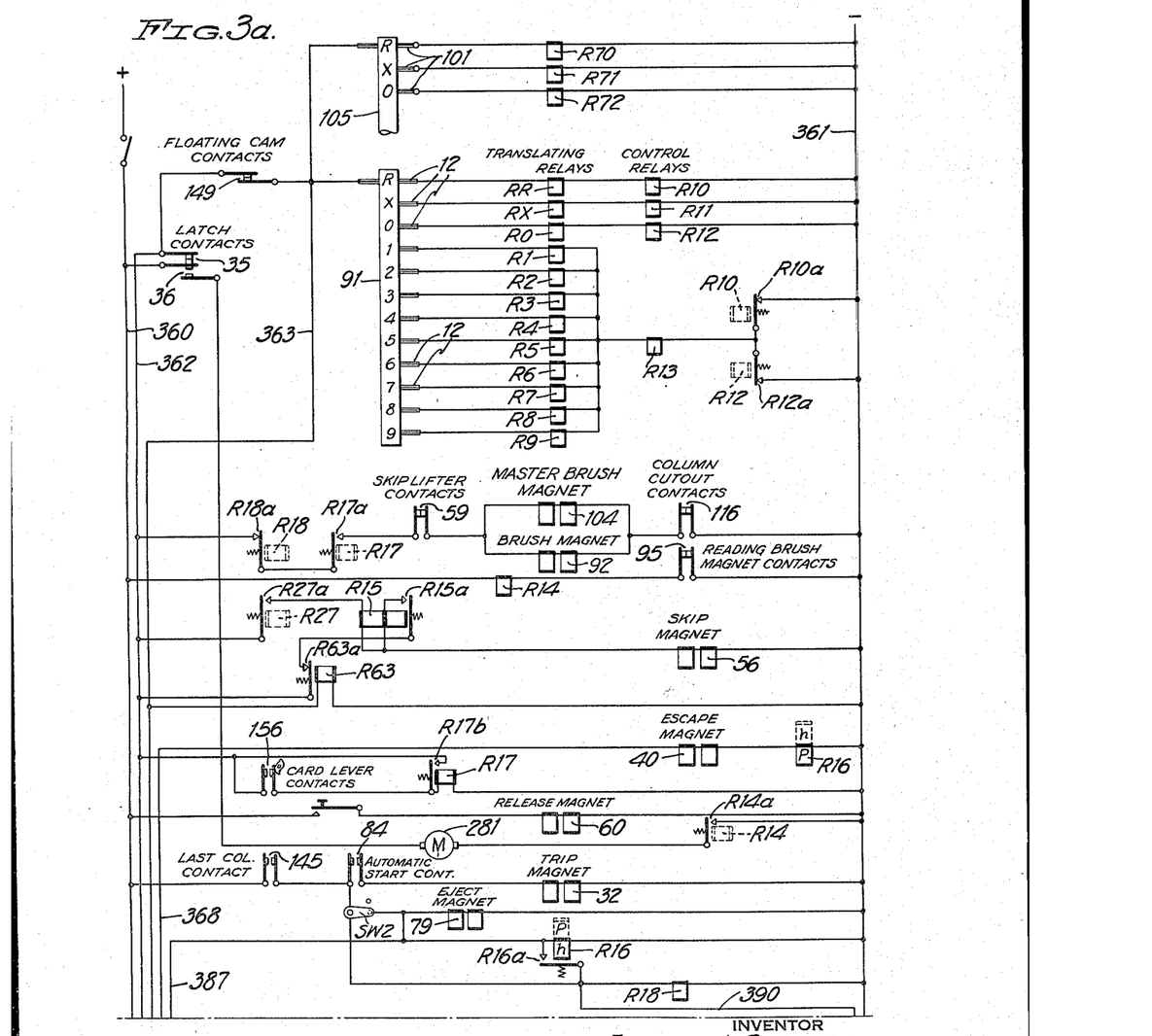
Figs. 3a, 3b, 3c and 3d are four parts of a circuit diagram of the entire apparatus and should be arranged in vertical sequence to make the complete diagram.

Immediately upon energization of relay R21, contacts R25a close, completing a circuit from wire 360, through normally closed contacts C1, wire 365, stop contacts R25a, the holding coil of relay R25 to line wire 361. Contacts R21b close, extending a circuit from wire 364, through said contacts, contacts R40c (normally closed), contacts R10b in normal position, contacts R11a in transferred position, (relay R11 was energized), contacts R13a and R30a in normal position, the pickup coil of relay R25 to line wire 361, energizing said supervisory relay. Contacts R25c open, disabling the circuits to be described presently to the distributing relays (Fig. 3c) and to the escape magnet 40 (Fig. 3a). Thus, when contacts R23a close later, said circuits will be open at the contacts R25c. Contacts R25e close to prepare a circuit which will be referred to presently, while contacts R25d open to disable a circuit referred to later on. Contacts R25b (Fig. 3e) close, completing a circuit from wire 360, through normally closed contacts C1, wire 366, said contacts R25b, wires 371, 372, 374 and 375, and tape punch selector magnets 232 pertaining to the tape code positions 1, 2, 4 and 5, to wire 361, energizing said selector magnets. The contacts 311 (Fig. 2) are closed by the bail lever 315, completing a circuit from wire 360, through normally closed contacts C1, said contacts 311, tape punch clutch magnet 300, relay R29 to wire 361, energizing said magnet and said relay. The relay contacts R29a (Fig. 13d) open to disable the circuit to the pickup coil of the carriage return relay R61.

Figure 3B:
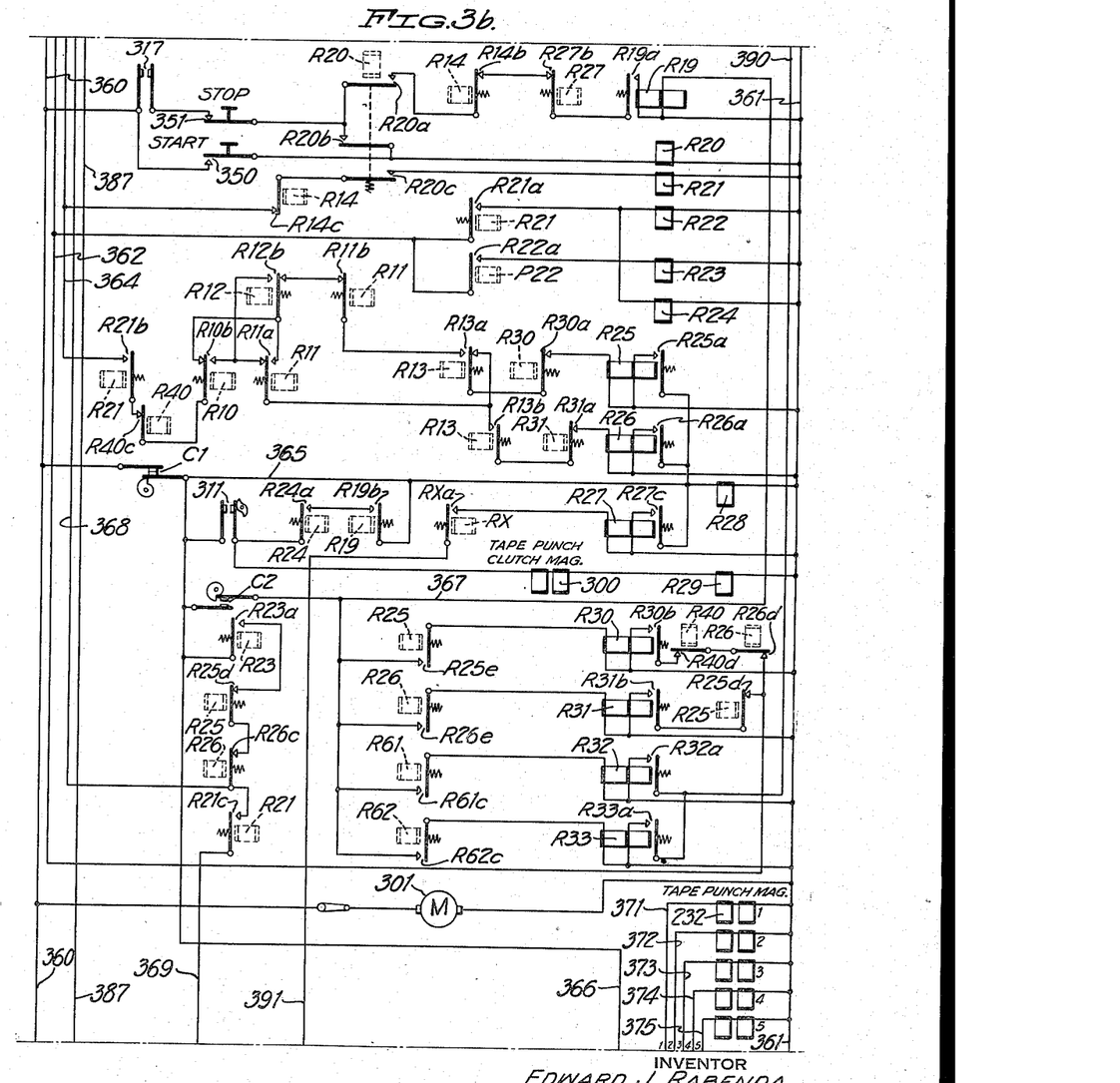
Figure 3C:
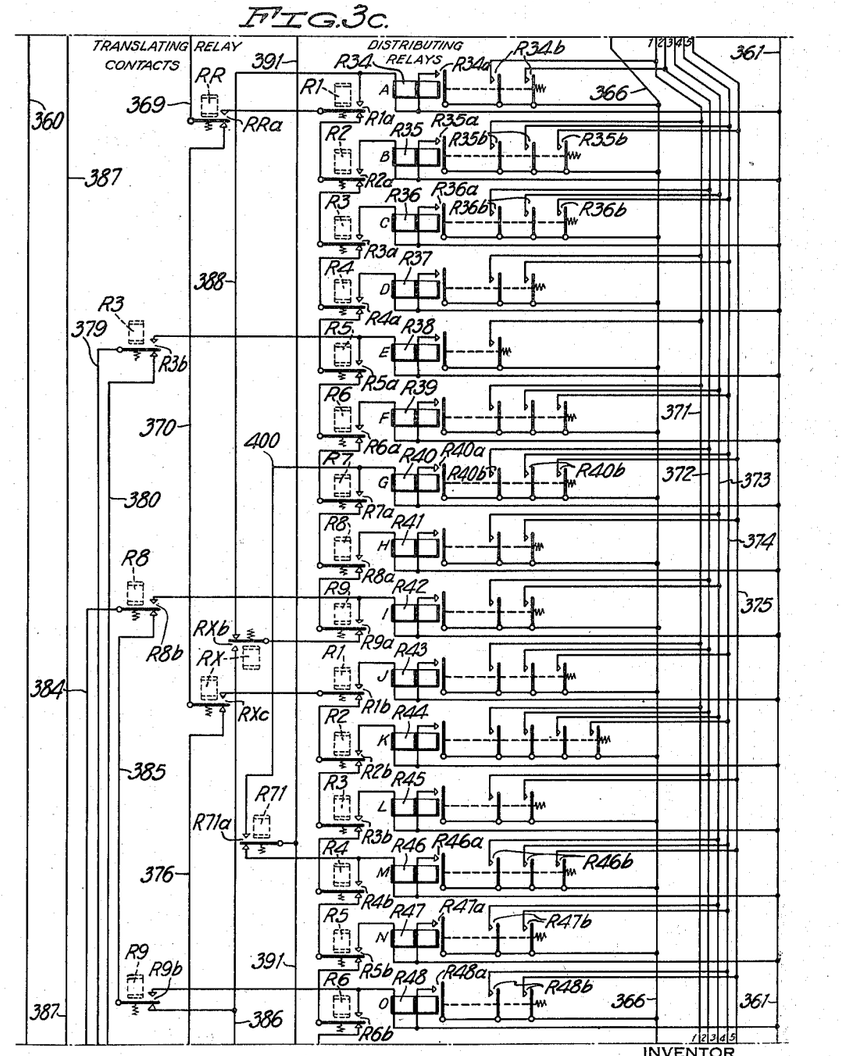
Figure 3D:
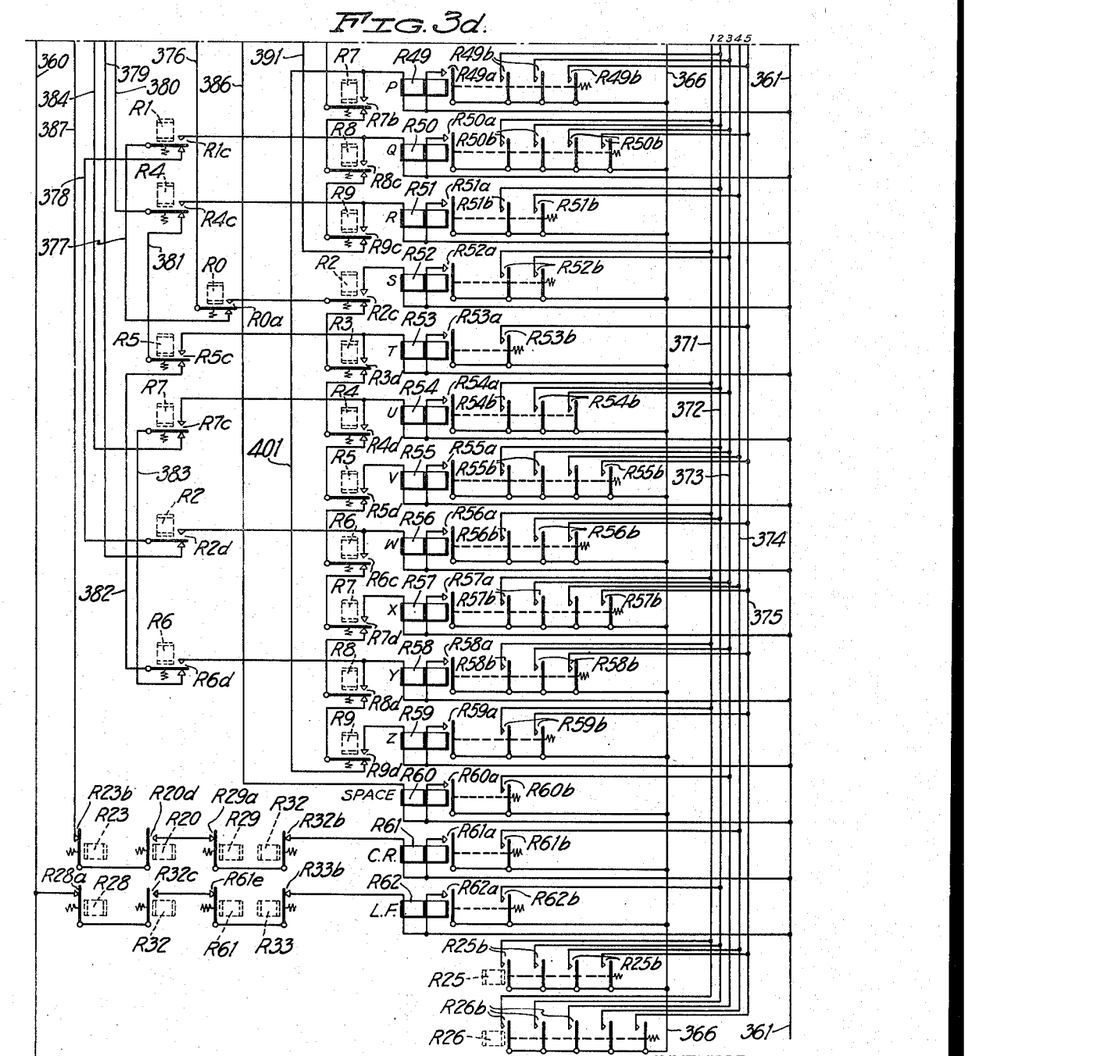

The energization of the tape punch clutch magnet 300 sets in operation the punch shaft and causes the perforation of the tape in code positions 1, 2, 4 and 5, the "figure shift" key code combination (see Fig. 9). The contacts C2 (Fig. 3b) close shortly after the punch shaft begins to rotate, completing a circuit from wire 360, through contacts C1 (still closed), said contacts C2, wire 367, pickup coil of relay R19 to wire 361, energizing said relay coil. Contacts R19a close, completing a circuit from wire 360, through contacts 317 (now closed), contacts 351, R20a (now closed), R14b, R27b, said contacts R19a, the holding coil of relay R19 to wire 361. Contacts R19b close to prepare a circuit branch shunting the bail lever contacts 311.

The branch circuit provides for continuous operation of the punch shaft in the manner described in the Mills and Rabenda application Serial No. 450,248. A circuit is also extended from line wire 360, through contacts C1 and C2 and through contacts R25e (now closed), pickup coil of relay R30 to wire 361, energizing said relay. Contacts R30b close, completing a circuit through the holding coil of relay R30 extended from wire 362, through contacts R26d (normally closed), said contacts R30b and said holding coil to wire 361. Contacts R30a open, disabling the circuit through the pickup coil of relay R25. When contacts C1 open soon after the punch shaft begins to rotate, the circuit through the holding coil of relay R25 is broken and said relay becomes deenergized. It cannot be energized again so long as contacts R30a remain open. The opening of contacts C1 also deenergizes the tape punch clutch magnet 300, but this magnet is reenergized when these contacts close before the end of the revolution of the punch shaft, because of the circuit extending through contacts R19b and R24a, so that a second revolution follows immediately. The opening of contacts C1 and C2 deenergizes the pickup coil of relay R30 and the contacts R25e maintain the circuit to this coil open. The opening of contacts C1 and R25b also breaks the circuits to the tape punch selector magnets 232.

When contacts C1 close near the end of the first revolution of the punch shaft, a circuit is extended from wire 360, through contacts R23a, R25c, R26c, and R21c (all now closed), wire 369, contacts RRa in normal position, contacts RXc in transferred position, contacts R1b, R2b—R7b, R8c, R9c (all in normal position), wire 391, contacts R71a in transferred position, wire 400, the pickup coil of relay R40, to wire 361, energizing said relay. Contacts R40a and R40b close, extending a circuit from wire 366, through said contacts R40a and the holding coil of relay R40 to wire 361, and from wire 366 through said contacts R40b and wires 371, 374 and 375 through the tape punch magnets 232 for code positions 2, 4 and 5, to wire 361, energizing said magnets. On the second revolution of the punch shaft, the combination 2, 4, 5 is punched in the tape (see Fig. 6), designating a skip or tabulate function. Contacts R40c open, disabling the circuits of the supervisory relays R25 and R26. Contacts R40d open, breaking the holding circuit of relay R30. Contacts R30a close, restoring the supervisory circuits to normal condition.

On closure of contacts C1 before the second cycle begins, a circuit is also extended through wire 368, escape magnet 40 and the pickup coil of relay R16 to wire 361. The energization of relay R16 at this time has no significance. Also, the energization of the escape magnet 40 at this time is of no consequence, because the control is taken over by the skip magnet, as will now be explained. On closure of contacts C1 at this time a circuit is also extended from wire 391, through contacts RXa (Fig. 3b) and pickup coil of relay R27, to wire 361, energizing said relay. Contacts R27c close, completing a circuit through the holding coil of relay R27, through the contacts C1. The contacts R27b open, breaking the holding circuit of relay R19. Contacts R19a and R19b open, the latter breaking the shunt circuit around the bail contacts 311. The punch clutch magnet 300 will, therefore, remain deenergized and the clutch will latch up at the end of the cycle. Contacts R27a close (Fig. 3a), completing a circuit from wire 360, through latch contacts 35, wire 362, said contacts R27a, pickup coil of relay R15, skip magnet 56 to line wire 361, energizing said pickup coil and said magnet. Contacts R15a close, preparing a holding circuit for relay R15, to be described presently. The skip magnet 56 shifts the skip lifter 51, which rises on the skip bar 50, raises the dog 47, and holds it out of engagement with the escapement bar 15 until the latter has traveled to column 22 position, where the next notch of the skip bar occurs. The lifting of the dog 47 opens the floating cam contacts 149. One effect of this is to deenergize the relay R63, so that the contacts R63a close and complete the holding circuit for relay R15 from wire 360, through latch contacts 35, wire 362, said contacts R63a, contacts R15a, and skip magnet 56, to wire 361.

The opening of the floating cam contacts 149 breaks a number of other circuits, including those through relays R71, RX, R11 and R21. Contacts R21a open, deenergizing relays R22 and R24, and contacts R22a open, deenergizing relay R23.

On reaching column 22 position, the dog 47 drops upon the escapement bar and stops the card feed, also allowing floating cam contacts 149 to close. Relay R63 is thereby reenergized and opens the contacts R63a, deenergizing the relay R15 and the skip magnet 56. The brushes 12 and 101 are at this time sensing column 22 of the detail card and the master card. Since the circuits are now in exactly the same condition as when the cards entered column 16 position, and since the perforations in column 22 of the master and detail cars are identical with those in column 16, the machine will go through exactly the same sequence of operations, punching the "figures shift" code and the "TAB" code in the tape and skipping to column 28.

When the floating cam contacts 149 close, upon arrival of the cards in the column 28 position, circuits are completed through said contacts, the contact roller 91, the hole in the 0 position of the detail card and the related brush 12, relays R0 and R12, to wire 361; also from contact roller 105, through the hole in the X position in the master card and the related brush 101 and relay R71 to wire 361. The relays R0, R12 and R71 are thereby energized; however, the energization of relay R71 at this time has no significance because there is no X hole in the corresponding column of the detail card. Also, upon closure of the floating cam contacts 149 a circuit is completed through wire 363, 364, contacts R14c, R20c (now closed), and relay R21 to wire 361. The pickup of the chain of relays R21—R24 is thereby started. Also, closure of contacts R21b completes a circuit from wire 364, through said contacts, contacts R40c, R10b in normal position, R12b in transferred position, R11a in normal position, R13a in normal position, R30a (now closed), and the pickup coil of relay R25 to wire 361, energizing said relay. The "figures shift" code is perforated in the tape as before, while the card feed mechanism is held in the same position for one cycle. When contacts C2 close, soon after the punch shaft begins to rotate, relay R19 is picked up and closes its holding circuit. Contacts R19b close, restoring the shunt circuit around the bail contacts 311, whereby the punch shaft is maintained in continuous operation, in the manner previously described. When the contacts C1 close near the end of this cycle, a circuit is extended through them and through contacts R23a, R25c, R26c, R21c (now all closed), wire 369, contacts RRa in normal position, wire 370, contacts RXc in normal position, wire 376, contacts R0a in transferred position, contacts R2c, R3d, R4d, R5d, R6c, R7d, R8d, R9d, all in normal position, wire 401, pickup coil of relay R49 to wire 361, energizing said relay. Contacts R49a and R49b close, the former establishing a holding circuit for the relay R49 and the latter completing a circuit from wire 366, through said contacts to wires 372, 373, and 375 and punch selector magnets 232 for the 2, 3 and 5 positions, to wire 361. The punch thereupon operates to perforate the tape with 2, 3, 5 combination representing a 0.

The other operations during which the columns 29 to 48 are sensed will not be described, since they are similar to those already referred to. When the cards arrive in column 49 position, there is a hole in the X position of the detail card and no hole in the master card. The relay RX is energized as before, but this time the circuit completed by its contacts extends from wire 369, through contacts RRa in normal position, wire 370, contacts RXc in transferred position, contacts R1b, R2b . . . R7b, R8c, R9c (all in normal position), wire 391, contacts R71a in normal position, pickup coil of relay R46 to wire 361, energizing said relay. The contacts R46b extend circuits to wires 373, 374, 375 and through punch selector magnets 232 for positions 3, 4, 5 to wire 361, energizing said magnets. The tape punch is thereby caused to punch the combination 3, 4, 5 in the tape, representing a period. By convention a period, when appearing in a certain column, is interpreted as 11. In this case it means the eleventh month, i. e. November.

Figure 6:
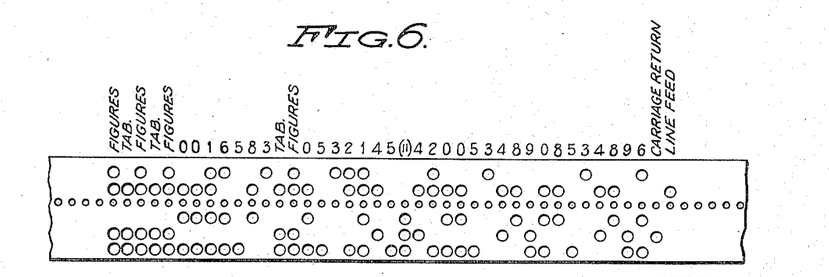
Fig. 6 is a diagram showing a section of telegraph tape perforated to represent the data on the master and detail cards shown in Figs. 4 and 5.

The sensing of the successive columns of the cards continues and the tape is perforated with the telegraphic code combinations shown in Fig. 6 in any column where a character code combination is sensed. In the particular illustration of the detail card shown on Fig. 5, columns 59-62 and 71-80 are skipped over by means of the high bar skip previously described, so that no code combinations appear in the tape corresponding to these columns.

As the card feed mechanism passes from the 79th to the 80th column position, the last column contacts 145 are closed, completing several circuits now to be described. It will be assumed that the switch SW2 is in the closed position shown in Fig. 3a. A circuit is completed from wire 366, through said contacts 145, switch SW2, eject magnet 79 to wire 361, energizing said magnet and causing the detail card to be flipped into the eject hopper in the well known manner. A second circuit extends through the holding coil of relay R16 to wire 361, energizing said relay. The contacts R16a close, extending the circuit through relay R18. Contacts R18a open, breaking the circuit of the brush magnets 92 and 104 so that the brushes are dropped. The reading brush magnet contacts 95 close, energizing relay R14 with results to be described presently. The closure of contacts R16a also extends a circuit through wire 390 to prepare a holding circuit for relays R32 and R33 (Fig. 3b).

Another circuit extends from switch SW2, through wire 387, contacts R23b in normal position, contacts R20d (now closed), contacts R29a and R32b in normal position, relay R61 to wire 361. Contacts R61a and R61b close, the first completing a holding circuit for the carriage return relay R61 and the second extending a circuit from wire 366, through wire 374 and punch selector magnet 232 for the 4 position, to wire 361, energizing said punch selector magnet and causing the punch to perforate the tape with the carriage return signal. Contacts R61e open, disabling the circuit to relay R62 temporarily. Contacts R61c close, preparing a circuit which is completed upon closure of contacts C2 during the cycle in which the carriage return signal is punched and which runs from wire 360, through contacts C1 and C2, contacts R61c and the pickup coil of relay R32 to wire 361, energizing said relay. Contacts R32a close, completing a holding circuit for said relay from wire 390; contacts R32b open, breaking the pickup circuit of relay R61. Contacts R32c and R61e close. When contacts C1 open in the cycle during which the carriage return signal is punched in the tape, the relay R28, which is energized whenever the contacts C1 are closed, is deenergized. Contacts R28a close, completing a circuit from wire 360, through said contacts R28a, the contacts R32c (now closed), contacts R61e and R33b in normal position, the pickup coil of relay R62 to line wire 361. The relay R62 is energized and closes its holding contacts R62a and the contacts R62b; the latter complete a circuit from wire 366, through wire 372, and punch magnet 232 for the 2 position, to wire 361. The punch perforates a hole in the 2 position, a line feed signal. The contacts R62c close and, when contacts C2 close during the cycle in which the line feed signal is punched, a circuit is completed from wire 360, through contacts C1 and C2, contacts R62c, the pickup coil of relay R33 to wire 361, energizing said relay. The holding contacts R33a close while the contacts R33b open, breaking the circuit to the pickup coil of relay R62.

The contacts R14b open when the relay R14 is energized, as above described, breaking the holding circuit of relay R19. Contacts R14a close, preparing a circuit for the motor 281. In the course of the operation initiated by the eject magnet 79, the auto start contacts 84 are closed, completing an obvious circuit through the trip magnet 32. This magnet causes the latch contacts 35 to open and contacts 36 to close, the latter completing the circuit through the motor 281. The function of the motor 281 is to feed a new card from the stack to the card sensing mechanism. This operation will not be described, since it has been explained previously in Patent 2,315,741 and the Mills & Rabenda application Serial No. 450,248.

Figure 7:
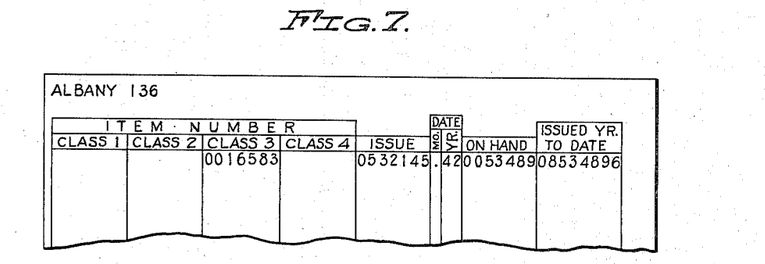
Fig. 7 is a diagram of the printed record produced by a telegraph printer from the perforated tape record shown in Fig. 6.

The tape shown in Fig. 6, when used to control an ordinary telegraph printer, will cause the latter to produce a printed record as shown in Fig. 7. At the upper left corner of this sheet the name and number of the depot have been typed in by the operator at the receiving station because, in accordance with the example, this information on the detail card is not perforated in the tape. The record sheet is ruled with vertical lines to separate the different fields in approximately the same way as the detail card. The first two fields pertaining to classes 1 and 2 are blank, as a result of tabulation control of the carriage of the printer resulting from the first four combinations punched in the tape. The next field relating to class 3 has the item number 0016583. This is followed by another blank field skipped by tabulation. The next field contains the number of items issued. In the following field the printer types a period. This being in the month field, it is understood to represent the eleventh month. The next three fields contain, respectively, the number of the year, the number of the items on hand, and the number issued during the year up to the date given. After printing the final 6, the carriage of the printer is returned and the paper is fed for a line, by the carriage return and line feed signals of the tape.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In an apparatus for punching telegraph code in a tape under control of code designations of a control record, means for sensing the control record, tape punching mechanism comprising a plurality of punch elements having individual electromagnetic control devices, a set of selecting relays for controlling the operation of said devices singly or in various groups, the selection controlled by each relay being different from those controlled by all the others, a plurality of energizing circuits, one for each of said relays, means controlled by said sensing means for selectively preparing said energizing circuits, a master control records having control designations thereon, means for sensing said master control record, and means operated in response to the sensing of a control designation by said last mentioned sensing means for disabling the energizing circuit prepared in response to the sensing of a particular code designation by said first mentioned sensing means and for preparing an energizing circuit to a different one of said selecting relays.

2. In an apparatus for punching telegraph code in a tape under control of code designations of a control record, means for sensing the control record, tape punching mechanism comprising a plurality of punch elements for punching in respective code positions of the tape, means controlled by said sensing means for normally controlling the selective operation of said punch elements singly and in various groups in dependence upon the code designations of said control record, a master control record having control designations thereon, means for sensing said master control record, and means operated in response to the sensing of a control designation by said last mentioned sensing means for causing said first mentioned sensing means to control a different selection of punch elements, in response to the sensing of particular code designation thereby, than the selection normally resulting from the sensing of said particular code designation.

3. In an apparatus for converting into a telegraphic code, data stored on a detail card in a statistical code wherein characters are represented by code designations arranged in columns, one column being assigned to each character and the characters being differentiated by placement of the code designations in different index point positions in the columns, a master card having control designations placed in selected columns corresponding to certain columns of the detail card, sensing means for each of said cards, means for feeding a detail card and the master card concurrently past their respective sensing means, a plurality of telegraphic code elements, translating means controlled by the detail card sensing means for selecting said code elements singly or in various combinations conformably to a normal translation of the statistical code designations on the detail card into the telegraphic code, and means operated in response to the sensing of a control designation on the master card for modifying the operation of said translating means under control of said detail card sensing means conformably to a special translation of a statistical code designation into a telegraphic code designation.

4. In apparatus for the selective operation of a plurality of electrically controlled code elements single or in various groups for coding intelligence, a detail control record whereon the intelligence is represented by code designations arranged in columns, means for sensing said detail control record column by column, means controlled by said sensing means for causing the selective operation of said code elements singly or in various groups, in accordance with a normal relation to the code designations of said control record, a master control record having control designations arranged in columns thereon, means for sensing said master control record column by column concurrently with the sensing of said detail control record, and means operated in response to the concurrent sensing of code and control designations by the two sensing means for causing a different selection of said code elements than that caused by the sensing of the same code designation by said first sensing means alone.

5. In an apparatus for the selective operation of a plurality of electrically controlled code elements singly or in various groups for coding intelligence represented by code designations on a control record, a set of selecting relays for controlling the operation of said code elements singly and in various groups, the selection controlled by each relay being different from those controlled by all the others, means for sensing the control record, a source of electrical current, means controlled by said sensing means for selectively routing current from said source to said relays normally in a certain way in dependence upon the code designations sensed on the control record, a master control record having control designations thereon, means for sensing said master control record, and means operated in response to the sensing of a control designation by said last mentioned sensing means for changing the normal routing of current to said relays by said first sensing means.

6. In a machine controlled by detail and master records having various code designations in different fields thereof, means for sensing corresponding fields of each of said detail and master records concurrently, a plurality of devices normally selectively controlled by said detail record sensing means in a certain way, in accordance with the code designations thereof, and means responsive to said master record sensing means, on the sensing of a certain code designation thereby concurrently with the sensing of a particular code designation by said detail record sensing means, for causing the latter to select a different one of said devices than the one normally selected thereby in response to the sensing of said particular code designation.

7. In a record controlled machine, means to sense different fields of a detail control record in succession, means to sense corresponding fields of a master control record concurrently with the sensing of the detail record, a plurality of devices selectively controlled by said detail record sensing means, and means operated by said master record sensing means for changing the selective control of said devices by said detail record sensing means.

8. In a record controlled machine, means for concurrently sensing code designations of a plurality of control records, a group of code elements, and means controlled jointly by said sensing means for controlling the selective operation of said code elements.

EDWARD J. RABENDA.